United States Patent [19]

Tocher

[11] Patent Number: 5,262,838
[45] Date of Patent: Nov. 16, 1993

[54] APPARATUS AND MEANS FOR BINOCULAR, SWITCHABLE TO BINOCULAR RANGEFINDER WITHOUT LIGHT LOSS

[75] Inventor: Angus J. Tocher, Calgary, Canada

[73] Assignee: VX Optronics Corp., Alberta, Canada

[21] Appl. No.: 761,856

[22] PCT Filed: Feb. 4, 1991

[86] PCT No.: PCT/CA91/00035
§ 371 Date: Sep. 10, 1991
§ 102(e) Date: Sep. 10, 1991

[87] PCT Pub. No.: WO91/12491
PCT Pub. Date: Aug. 22, 1991

[30] Foreign Application Priority Data

Feb. 9, 1990 [CA] Canada .................. 2009711

[51] Int. Cl.$^5$ .............................. G01C 3/08
[52] U.S. Cl. .................... 356/16; 356/19; 359/431
[58] Field of Search .......... 356/3, 16, 17, 19, 141, 356/147; 359/407, 431, 222; 33/284

[56] References Cited

U.S. PATENT DOCUMENTS

| | | | |
|---|---|---|---|
| 2,910,912 | 11/1959 | Wohler | 356/17 |
| 3,156,825 | 11/1964 | Lines | 359/222 |
| 3,499,711 | 3/1970 | Argyle | 356/5 |
| 3,663,105 | 5/1972 | Anderson | 356/4 |
| 3,752,591 | 8/1973 | Feldman | 356/140 |
| 3,895,871 | 7/1975 | Strasser | 356/141 |
| 4,009,960 | 3/1977 | Feldman et al. | 356/4 |
| 4,048,653 | 9/1977 | Spooner | 358/104 |
| 4,274,149 | 6/1981 | Flanagan | 368/10 |
| 4,315,241 | 2/1982 | Spooner | 340/27 R |
| 4,322,726 | 3/1982 | Collier et al. | 340/705 |
| 4,347,507 | 8/1982 | Spooner | 340/705 |
| 4,429,960 | 2/1984 | Mocilac et al. | 351/212 |
| 4,544,243 | 10/1985 | Munnerlyn | 350/514 |
| 4,558,359 | 12/1985 | Kuperman et al. | 358/89 |
| 4,606,630 | 8/1986 | Haruki et al. | 356/1 |
| 4,628,210 | 12/1986 | Hobrough | 250/558 |
| 4,716,534 | 12/1987 | Baucom et al. | 364/559 |
| 4,752,126 | 6/1989 | Fujii | 356/147 |
| 4,886,347 | 12/1989 | Monroe | 356/12 |

FOREIGN PATENT DOCUMENTS

| | | |
|---|---|---|
| 452827 | 11/1948 | Canada . |
| 452835 | 11/1948 | Canada . |
| 456703 | 5/1949 | Canada . |
| 460869 | 11/1949 | Canada . |
| 478857 | 11/1951 | Canada . |
| 549248 | 11/1957 | Canada . |
| 580335 | 7/1959 | Canada . |
| 889411 | 12/1971 | Canada . |
| 931345 | 8/1973 | Canada . |
| 1058434 | 7/1979 | Canada . |
| 1146741 | 5/1983 | Canada . |
| 1150049 | 7/1983 | Canada . |
| 1164570 | 3/1984 | Canada . |
| 1181944 | 2/1985 | Canada . |
| 0311979 | 4/1989 | European Pat. Off. . |
| 951484 | 10/1956 | Fed. Rep. of Germany . |
| 1906034 | 8/1970 | Fed. Rep. of Germany . |
| 3425946A1 | 1/1985 | Fed. Rep. of Germany . |

Primary Examiner—Richard A. Rosenberger
Attorney, Agent, or Firm—Sheridan Ross & McIntosh

[57] ABSTRACT

The invention is directed to an electro-optical rangefinding-type apparatus which uses electronic sensors to detect the position and orientation of the apparatus relative to a fixed point. Data from the sensors is relayed to a microprocessor which can calculate parameters such as range, horizontal distance and angle, vertical distance and angle, relative speed and magnetic bearing of a target objective, which are then displayed. A preferred embodiment of the invention is convertible between the functions of a stereoscopic binocular and a coincidence-type range-finder and means are provided for converting the apparatus to and from the binocular and rangefinding modes.

5 Claims, 6 Drawing Sheets

APPARATUS AND MEANS FOR BINOCULAR, SWITCHABLE TO BINOCULAR RANGEFINDER WITHOUT LIGHT LOSS

The present invention is directed to an optical apparatus which may be used to measure the range, magnetic bearing or vertical distance between the apparatus and a single target objective, and which may also be used to measure range, vertical or horizontal distances; vertical or horizontal angles between two or more target objectives as viewed from the perspective of the apparatus or the relative speed of a remote objective. The apparatus may also be used to measure the surface area or volume of a target objective. The invention is also directed to a coincidence type optical rangefinder, and means for conversion to or from a stereoscopic binocular.

Optical measuring devices, such as rangefinders, are known. Conventional rangefinders (e.g. of the type shown in Canadian patent nos. 456,703; 452,835; 580,335; 452,827; 460,869 and 478,857) feature a pair of windows through which light rays from an objective enter the range-finder. The light rays are reflected through a system of prisms or lenses so that duplicate images of the objective are realized in the observer's field of vision. The observer then causes the two images to be brought into coincidence by manipulating deviating means so as to cause refraction of the light comprising one of the images, thereby aligning it with the light comprising the other image and bringing the two images into coincidence. The deviating means are mechanically associated with a linear scale which is calibrated such that the amount of displacement or rotation of the deviating means sufficient to cause coincidence of the dual images is a function of the range of the objective, which can be read from the scale.

Conventional rangefinders have the disadvantage of limited mechanical and thermal stability and limited ranging accuracy. Factors which influence this include the length of the base line between the windows through which light rays from an objective enter the rangefinder, the magnification of the image, the angular acuity of the human eye or photosensitive component used to align images into coincidence, the type of deviating element used and the precision of the associated mechanical linkage to the ranging scale. The accuracy of conventional optical range-finders also depends upon proper calibration between the scale and deviating element which may be upset by jarring of the instrument, or by changes in ambient temperature. As a result of these sensitivities, conventional optical rangefinders must be frequently recalibrated to maintain accuracy.

Rangefinders of the type shown in Canadian patents nos. 549,248; 456,703 and 452,835 are monocular devices, which generally are more difficult to use for an extended period of time than binocular devices. Stereoscopic binocular optical rangefinders are known (e.g. Canadian patents nos. 889,411 and 931,345). However, such devices are not coincidence-type binocular optical rangefinders which provide coincident images to both eyepieces. Coincidence type optical rangefinders are generally considered to be more accurate and easier to use than stereoscopic optical rangefinders. However, conventional coincidence type optical rangefinders may not be converted for stereoscopic binocular viewing without significant light loss occurring at the beamsplitter.

The present invention overcomes the disadvantages of the prior art by providing an optical apparatus or instrument which can be used as a conventional monocular or binocular viewing instrument for measuring and calculating a variety of parameters pertaining to one or more target objectives.

Such parameters may be selected from, but not limited to, the following: range, height, magnetic bearing, speed, surface area, geographic coordinates, or spatial distances between two points, (such as vertical or horizontal distances or angles between two or more remote points with vertical/horizontal separation as viewed through the eyepiece(s) of the instrument).

Conventional optical rangefinding systems employ mechanical means such as cams, levers and gears to transmit and translate the displacement of the deviating element to useful information.

According to one embodiment of the present invention, such mechanical means are replaced to a great extent by electronic means. Parameters relating to the target objective may be measured and calculated electronically by a microprocessor using inputted data received from sensors. The number of mechanical parts associated with the calculation and display of information is reduced, and the apparatus is more resistant to the effects of impact and fluctuations in ambient temperature than are conventional rangefinders with the result that the frequency with which the instrument needs to be recalibrated is greatly reduced.

Further, the utilization of a microprocessor or microcontroller permits the user to test the device for minor error and recalibrate, if necessary.

In addition, the use of electronic sensors permits the calculated parameters to be displayed digitally if desired within the field of view of one of the eyepieces, avoiding the need to read and interpret a linear type scale.

When using one embodiment of the invention the observer selects the target objective, dual or split images of which appear in the field of view of the instrument. The observer causes the dual (or split) images to be brought into coincidence, by causing displacement of a deviating element, and selects a parameter relating to the target objective which is to be calculated, using a control panel mounted on the instrument.

The amount or degree of physical displacement of the deviating element which is necessary to maintain a single target image within the observer's field of vision, is detected by an electronic sensor which translates this information as directly as possible into an electrical signal which is relayed to a microprocessor, along with data from other electronic sensors which detect the horizontal and vertical displacement or orientation of the apparatus; and the azimuth orientation of the apparatus with respect to the natural magnetic lines of the earth. The selected parameter is calculated by a microprocessor using electronic data received from the sensors. In one embodiment, the calculated parameter may be displayed within the observer's field of view by e.g. a digital display superimposed through an eyepiece of the apparatus.

Preferably, the invention takes the form of binoculars, which subject the observer to less eyestrain than a monocular device, and offers the additional advantage of being easily portable. In the embodiment of the invention which features dual eyepieces, means for adjusting the distance between the eyepieces is preferably provided, in order to allow for correct interpupillary alignment for a variety of users.

In a preferred embodiment, the apparatus of the present invention may be quickly and easily converted to and from a binocular without overlapping or split coincident images to a coincidence type optical rangefinder with coincident images for ranging target objectives.

In a further aspect, the invention is directed to means for converting a binocular to a coincidence type binocular optical rangefinder, thereby greatly enhancing the utility of the conventional binocular and the conventional coincidence type optical rangefinder. Such means consists of a switchable beamsplitter which allows a binocular instrument having separated right and left hand optical paths of light between the entrance window(s) to the eyepieces, to be converted to a coincidence-type optical rangefinder where merging of the right and left optical paths occurs at the beamsplitter.

In one aspect, the invention provides an optical apparatus switchable between the functions of an observation binocular, wherein single target object images are formed from each of two eyepieces, and the functions of a coincidence type optical rangefinder wherein dual said target object images are formed within the field of view of at least one of said two eyepieces, comprising:

(a) a pair of spaced entrance windows to receive electromagnetic radiation from said target object;
(b) a pair of eyepieces;
(c) a switchable beamsplitter, switchable between the said functions of an observation binocular and the said functions of a coincidence type optical rangefinder, comprising a pair of prisms, each having at least one total internal reflection face wherein these said total internal reflection faces form an interface and are substantially plane parallel with respect to each other;
(d) means, for causing the said switchable beamsplitter to be switchable, between the said functions of an observation binocular, wherein the said interface comprises a medium of refractive index sufficient to effect total internal reflection of said electromagnetic radiation incident upon said interface, and between the said functions of a coincidence type optical rangefinder wherein the said interface comprises a medium of refractive index sufficient to effect partial reflection, and partial transmission of said electromagnetic radiation incident upon said interface;
(e) a first series of reflectors or lenses which direct said electromagnetic radiation from said windows to said switchable beamsplitter;
(f) coincidence sensor means, for sensing the angle of parallax formed by the said target object and the said pair of spaced entrance windows;
(g) a second series of reflectors or lenses for directing said electromagnetic radiation from said switchable beamsplitter to said eyepieces;
(h) translation means, for transforming information from said coincidence sensor means into parameters relating to the position, dimension, or orientation of said target object relative to said apparatus; and
(i) display means for displaying said parameters.

A further aspect of the invention provides an optical apparatus wherein said means for causing the said switchable beamsplitter to be switchable comprises: moving at least one of said prisms from a first position wherein said medium of refractive index is of sufficient thickness to effect total internal reflection, to a second closer position wherein said medium of refractive index is of sufficient thickness to effect frustrated total internal reflection.

A further aspect of the invention provides an optical apparatus wherein said means for causing the said switchable beamsplitter to be switchable comprises:

(a) a layer of liquid crystal material filling the said interface between the said total internal reflection faces of said pair of prisms, whereby, in a first total internal reflection mode, said electromagnetic radiation incident upon said layer of liquid crystal material at angles greater than the critical angle, will be totally internally reflected, and in a second partial reflection, partial transmission mode, an electromagnetic field is applied across said liquid crystal material whereby the refractive index of said liquid crystal material is altered such that said electromagnetic radiation incident upon said liquid crystal is divided into two polarization components, one of said polarization components being totally, or nearly totally reflected, and the other of said polarization components being totally, or nearly totally transmitted;
(b) power supply means for energizing and introducing said electromagnetic field across said layer of liquid crystal material; and
(c) control means, for switching said electromagnetic field to effect a said first total internal reflection mode, and to effect a said second partial reflection, partial transmission mode.

A further aspect of the invention provides an optical apparatus wherein said pair of prisms each of which has at least one total internal reflection face, each said prism additionally comprises a second internal reflection face oriented to said at least one total internal reflection face at substantially 90 degrees, whereby said electromagnetic radiation entering said prism will be reflected substantially 180 degrees within said prism.

A further aspect of the invention provides an optical apparatus wherein at least one of said total internal reflection faces additionally comprises an optical coating, such that when used in the said functions of an observation binocular, said electromagnetic radiation incident upon said medium of refractive index at angles greater than the critical angle will be totally internally reflected, and form substantially naturally colored images, and when used in the functions of a coincidence type optical rangefinder, said electromagnetic radiation incident upon said optical coating will be divided into two different wavelength groups of the electromagnetic spectrum, one said group being reflected, and the other said group being transmitted through said medium of refractive index.

In a further aspect, the invention provides a switchable beamsplitter comprising:

(a) a pair of prisms, each having at least one total internal reflection face wherein these said total internal reflection faces form an interface and are substantially plane parallel with respect to each other;
(b) a layer of liquid crystal material filling the said interface between the said total internal reflection faces of said pair of prisms, whereby in a first total internal reflection mode, electromagnetic radiation incident upon said layer of liquid crystal material at angles greater than the critical angle will be totally internally reflected and in a second partial reflection, partial transmission mode, an electromagnetic field is applied across said liquid crystal material whereby the refractive index of said liquid crystal material is altered such that said electromagnetic radiation incident upon said liquid crystal material is divided into two polarization components, one of said components being totally, or nearly totally reflected, and the other of said polarization components being totally, or nearly totally transmitted;

(c) said pair of prisms each of which additionally comprises a second internal reflection face oriented to said at least one total internal reflection face at substantially 90 degrees whereby electromagnetic radiation entering said prism will be reflected substantially 180 degrees within said prism;

(d) power supply means, for energizing and introducing said electromagnetic field across said layer of liquid crystal material;

(e) control means, for switching said electromagnetic field to effect a said first total internal reflection mode, and to effect a said second partial reflection, partial transmission mode.

In a still further aspect, the invention provides a switchable beamsplitter wherein said at least one total internal reflection face additionally comprises an optical coating, whereby in said first total internal reflection mode, said electromagnetic radiation incident upon said layer of liquid crystal material at angles greater than the critical angle, will be totally internally reflected, and form substantially naturally colored images, and in said second partial reflection, partial transmission mode, said electromagnetic field incident upon said optical coating will be divided into two different wavelength groups of the electromagnetic spectrum, one said group being reflected, and the other said group being transmitted through said layer of liquid crystal.

These and other aspects of the invention will now be more particularly described with reference to the accompanying drawings, which illustrate embodiment of the invention.

Figure 1:
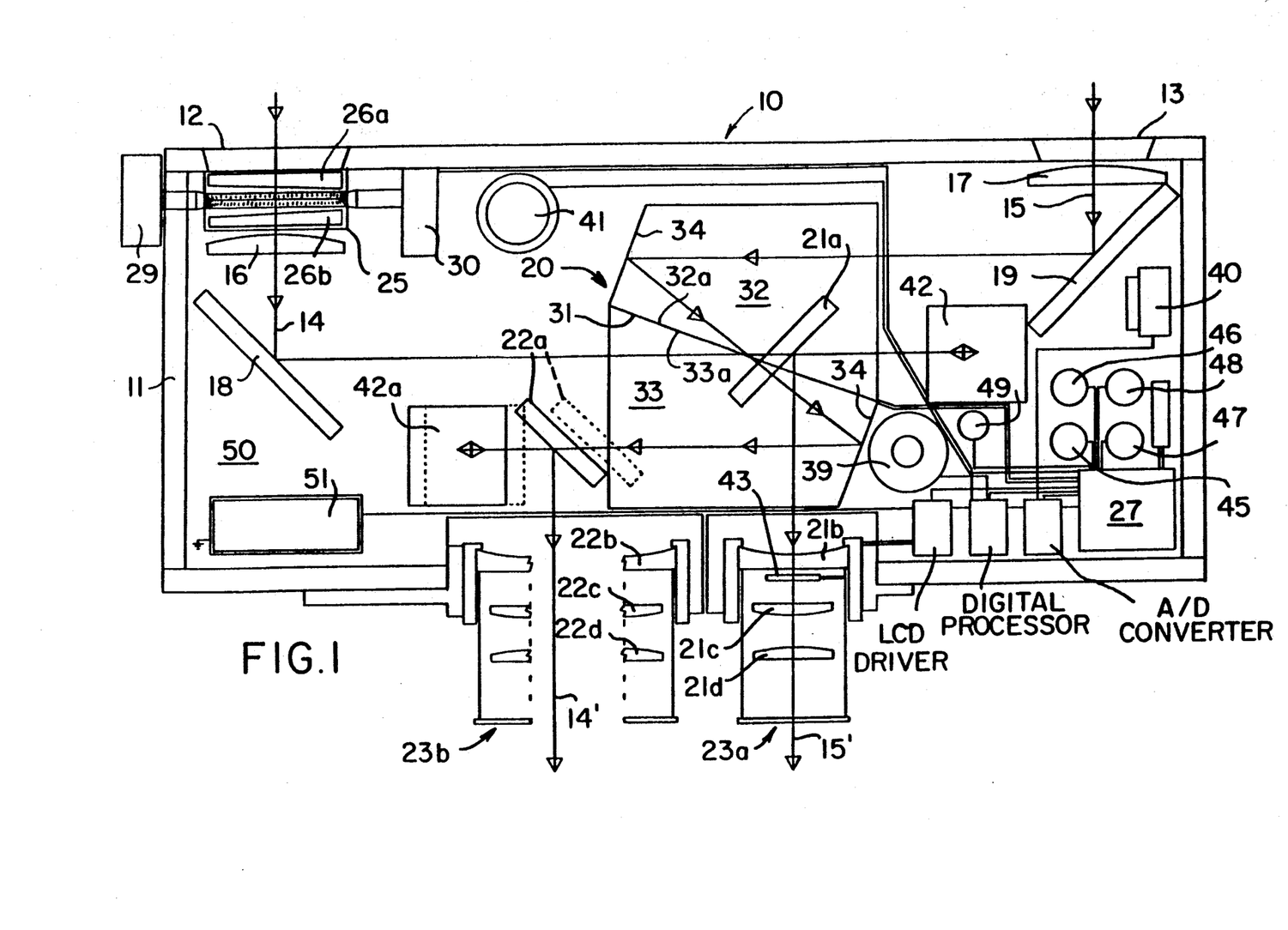
FIG. 1 shows a plan view of the interior of an embodiment of the invention, with one of the eyepieces shown in two different interuypillary positions.
Figure 1A:
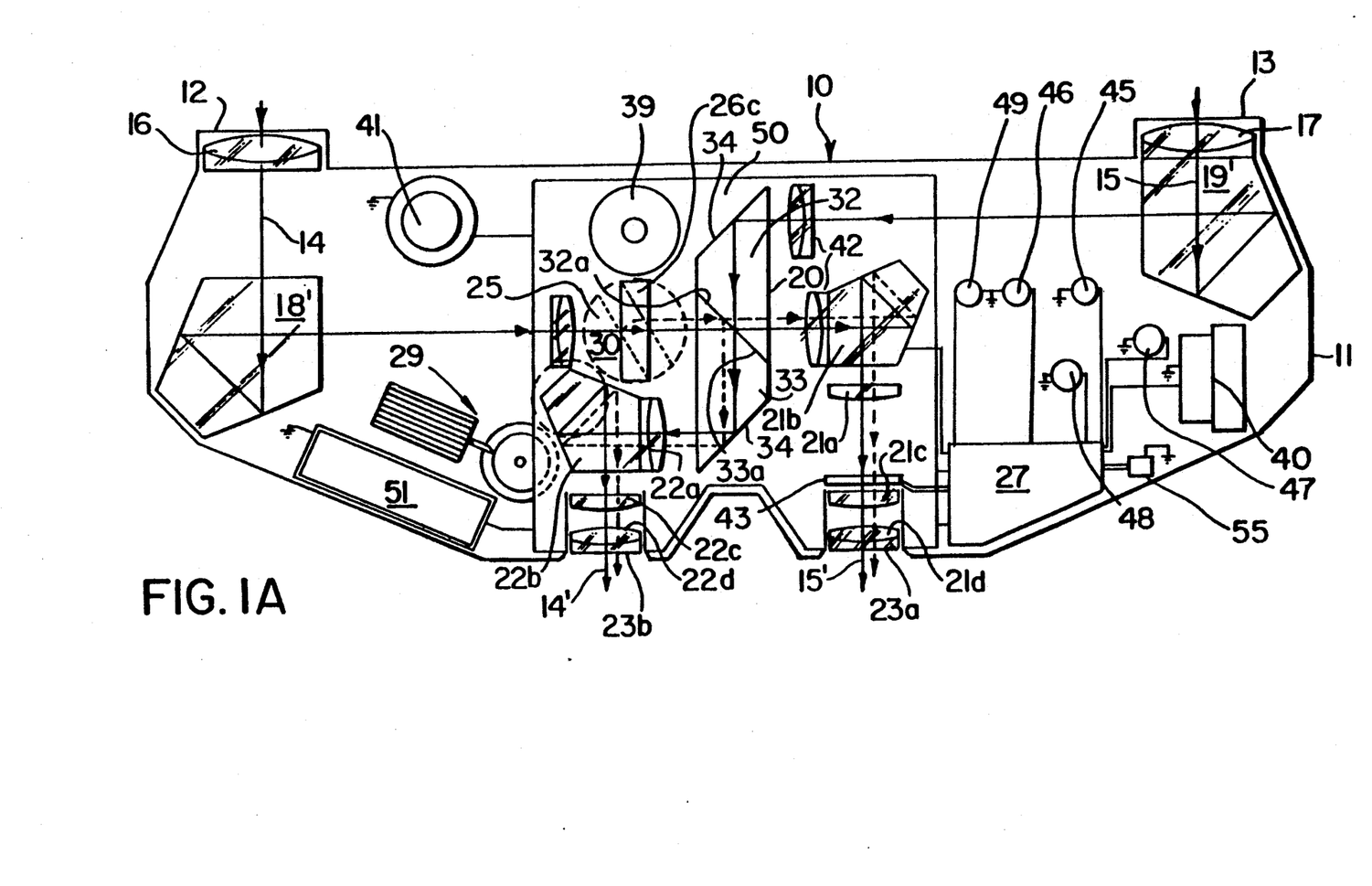
FIG. 1A is a plan view of the interior of another embodiment of the invention.
Figure 2:
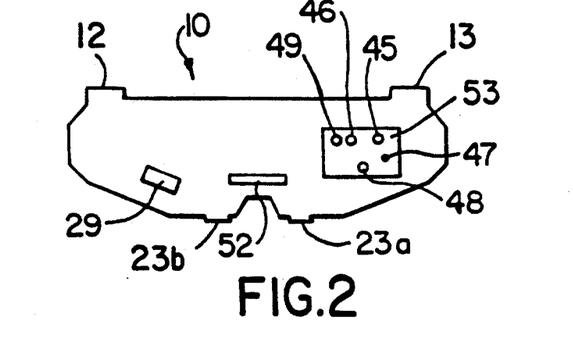
FIG. 2 shows a plan view of the embodiment of the invention which is shown in FIG. 1A.

The optical apparatus 10 of the present invention consists of a casing 11 which has a pair of windows 12, 13 for receiving electromagnetic radiation, hereby also referred to as light beams, or light, represented as 14, 15 from a target object (not shown). The light beams 14, 15 pass through objective lenses 16, 17 and are reflected by mirrors 18, 19. Those skilled in the art will appreciate that the arrangements of lenses and prisms depicted in FIGS. 1 and 1A are intended to illustrate representative arrangement and that other equivalents are not excluded from the scope of this invention. For example, objective lenses 16, 17, could alternatively be a single lens or prism and/or a series of same and prisms 18', 19' could be used as an alternative to mirrors 18, 19. If prisms are used as an alternative to mirrors, such prisms would preferably be pentaprisms which have the advantage of being able to continue to reflect light at an angle of 90° in the horizontal plane, even when having been subjected to slight jarring or displacement.

Light beams 14, 15 are directed to switchable beamsplitter 20. Beamsplitter 20 is capable of simultaneously merging incoming light beams 14, 15 and splitting the merged beam into two beams 14', 15', thereby providing the observer with dual images of the target objective.

The switchable beamsplitter will preferably feature a low number of internal reflective surfaces thereby minimizing loss of light and promoting sharper resolution of the target objective. A conventional beamsplitter having an interface oriented to incident light at approximately 45° may be used. In this embodiment, the invention can function either as an apparatus to calculate parameters relating to a target objective or as conventional binoculars. However, if used as conventional binoculars, dual images of the target objective will appear in the eyepieces of the instrument, and these can be made to form a single coincident image by adjusting coincidence sensor 25, as more particularly discussed below.

In a preferred embodiment, the invention is switchable between the functions of a conventional binocular and an apparatus which is capable of measuring range and other spatial or geographic parameters or co-ordinates pertaining to a target objective.

A preferred means for achieving this result, (i.e. switching from a binocular instrument with separated right and left hand optical paths of light from entrance window to eyepiece, to a coincident type optical rangefinder where mixing of the right and left hand optical paths of light occurs at the beamsplitter) uses a novel type of beamsplitter ("switchable beamsplitter") which constitutes another aspect of the invention.

Switchable beamsplitters are illustrated in FIGS. 1, 4, 4A, and 4B. One embodiment of switchable beamsplitter 20 consists of a pair of switchable beamsplitter prisms 32, 33 with a minimum number of additional internal reflection faces 34 which direct light entering the switchable beamsplitter from left and right hand windows 12, 13 to be incident upon an interface 31 which comprises a medium of refractive index 36, which in this case, is a layer of liquid crystal material 24 sandwiched between the total internal reflection faces 32a and 33a of the pair of beamsplitter prisms 32, 33.

This type of switchable beamsplitter 20 uses the birefringement properties of liquid crystal materials, i.e. the property of exhibiting a different index of refraction for each of two different plane polarizations of light. A beam of light incident upon an optically non-linear surface such as a layer of liquid crystal material 24 in contact with prisms 32, 33 of a switchable beamsplitter 20 will have two different critical angles which may be determined using Snell's Law, the refractive index of the prism material, and the two refractive indices of the liquid crystal material. The switchable beamsplitter 20, and the liquid crystal may be so designed that when an apparatus with a switchable beamsplitter 20 of the type described is to be used for stereo binocular viewing, ("total internal reflection mode"), the layer of liquid crystal material 24 as the medium of refractive index 36 between the switchable beamsplitter prisms 32, 33, is of a refractive index sufficient to effect total internal reflection of light beams. Light which is incident upon the layer of liquid crystal material 24 of the switchable beamsplitter 20 from either side at slightly greater than the critical angle, is totally internally reflected, and there is no mixing across the beamsplitter interface of the right and left hand optical paths of light from the entrance windows or the eyepieces.

When the apparatus is placed in the "partial transmission, partial reflection mode", for example, when binocular coincidence type rangefinding is desired, the layer of liquid crystal material 24 is subjected to an electromagnetic field of sufficient intensity to cause reorientation of the liquid crystal molecules, such reorientation causing light which is incident upon the interface 31 of the switchable beamsplitter prisms 32, 33 and liquid crystal material 24 at slightly greater than the critical angle, to be divided into first and second polarized components, one polarized component being internally reflected while the other polarized component is transmitted across the liquid crystal material 24 and into the other beamsplitter prism 32, or 33 to mix with the reflected polarized component from light incident upon the liquid crystal material 24 and originating from the opposite entrance window of the apparatus. This said electromagnetic field may be supplied and energized by power supply means 51, such as batteries.

Figure 3:
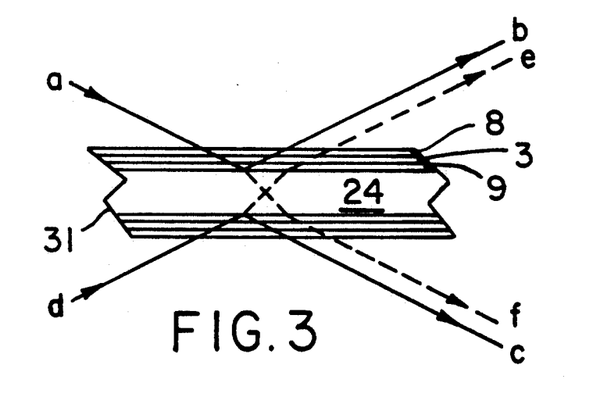
FIG. 3 is a schematic representation of a section of the interface of a preferred form of switchable beamsplitter.

This is schematically illustrated in FIG. 3, where the solid lines represent beams of light which are reflected at the beamsplitter interface, while the dotted lines represent beams of light which are transmitted across the beamsplitter interface. Therefore, in the total internal reflection mode as described, beams of light 'a' and 'd' incident upon the beamsplitter interface 31 of the beamsplitter prisms 32, 33 and the liquid crystal 24 are totally internally reflected. In the partial transmission, partial reflection mode mode as described, beams of light 'a' and 'd' incident upon the beamsplitter interface 31 are divided into polarization components, respectively 'b' and 'f' and 'e' and 'c'. The 'b' and 'c' polarization components are internally reflected, while the 'e' and 'f' components are transmitted across the liquid crystal material 24 to mix respectively with reflected components 'b' and 'c'. Thus, mixed components 'b' and 'e' and mixed components 'f' and 'c' consist of light beams which originate from both entrance windows of the apparatus 10. Where this type of switchable beamsplitter is employed as a component of the convertible binocular/coincidence type optical rangefinder, separate images are formed in each eyepiece when the apparatus is in the total internal reflection mode, and dual or split images are formed to allow coincidence type optical rangefinding in one or both eyepieces when the apparatus is in the partial reflection, partial transmission mode, allowing the user to adjust these images into coincidence.

This type of switchable beamsplitter 20 is well suited to the functional requirements of a convertible binocular/coincidence type optical rangefinder of the present invention as it allows the apparatus to be used as a binocular without significant transmission or reflection light loss at the beamsplitter, and then as a coincidence type binocular optical rangefinder with coincident images provided to both eyepieces.

In one possible embodiment of this type of switchable beamsplitter 20, the pair of prisms 32, 33 may be of dense flint glass, such as SF-10, with a refractive index of approximately 1.728. A first coating 8 of a thin transparent electrode coating of about 300 angstroms thickness is applied to the face of each beamsplitter half which meet to form the interface 31 of the pair of prisms 32, 33. Indium tin oxide (ITO) is commonly used as an electrode coating although other coatings may also be used. This coating is necessary to impose an electromagnetic field upon the liquid crystal material at the beamsplitter interface sufficient in intensity to cause uniform reorientation of the liquid crystal molecules and thus effect splitting of light incident upon the interface into first and second polarized components.

A surface alignment layer 9 is deposited as a second coating on top of the transparent electrode coating and serves to uniformly align the liquid crystal material at the interface. This surface alignment layer is commonly a spin coated polymer that is unidirectionally rubbed along the desired plane of the liquid crystal material. Other means of alignment of the liquid crystal material 24 may be used, e.g., the oblique deposition of a thin film (approximately 100 angstroms) of silicon monoxide.

The pair of prisms 32, 33 are then assembled with a thin layer of liquid crystal 24 of about 10 microns filling the interface 31 between the pair of prisms 32, 33. This interface 31 may be then sealed from dust and atmosphere. The liquid crystal material 24 used in this model is known by names such as ZLI-3926* and is available through BDH in Canada or E.M. Chemicals in the U.S. ZLI-3926 has an $N_o$ of about 1.52 and an $N_e$ of about 1.72. This combination will provide total internal reflection, in the total internal reflection mode, of light incident upon the beamsplitter interface 31 of greater than about 1.1 radians and provide nearly total transmission of one polarization component in the partial transmission, partial reflection mode for a wide range of angles of incidence at the interface from about 1.1 radians to about 1.4 radians. Various combinations of refractive indices of the substrate which makes up the a pair of prisms 32, 33 and of the liquid crystal material 24 may be used depending on the desired results.

Figure 4:
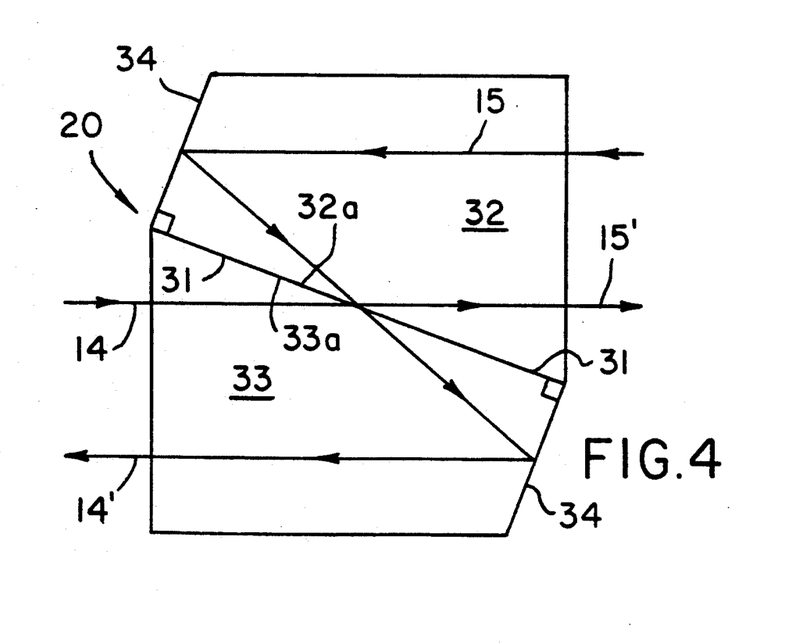
FIG. 4 is an illustration of a preferred embodiment of switchable beamsplitter, according to the invention.
Figure 4A:
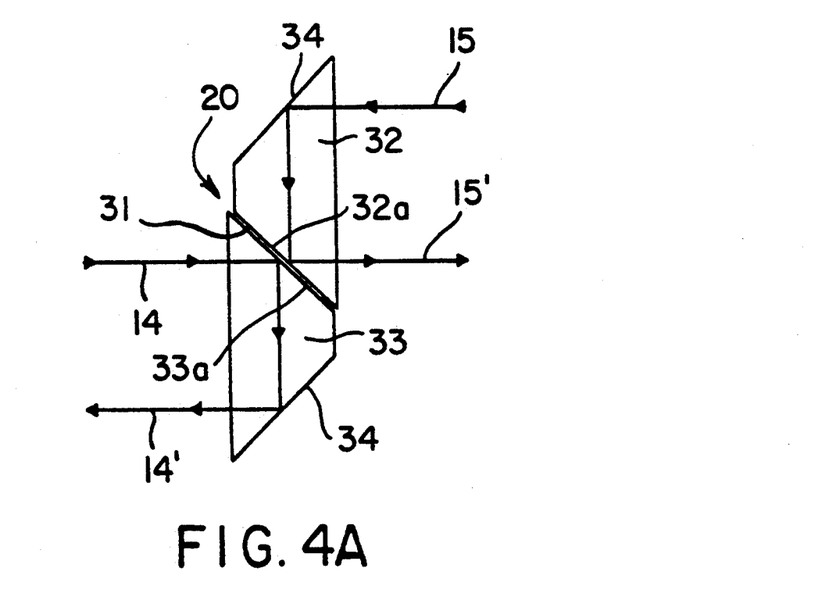
FIGS. 4A and 4B show an alternative embodiment of a switchable beamsplitter for use in one embodiment of the invention.

An alternative form of switchable beamsplitter 20 consists of an arrangement of prisms featuring total internal reflection faces 32a and 33a oriented substantially plane parallel to each other. The prisms comprising this type of switchable beamsplitter 20 are convertible between a first total internal reflection mode where an apparatus equipped with such a beamsplitter may be used as a binocular and a second partial transmission, partial reflection mode where the apparatus can be used as a rangefinder. In the total internal reflection mode the prisms (as shown in FIG. 4A) are separated by a thin medium of refractive index 36a having a low index of refraction such as air, sufficient to permit total internal reflection of the incoming light beams 14, 15 within both prisms, and disallowing mixing of light beams within the prisms. When this form of switchable beamsplitter 20 is in this first position, no mixing of the incoming light beams 14, 15 will occur at the interface 31, and the images appearing in either eyepiece will be a single image of the target objective.

Figure 4B:
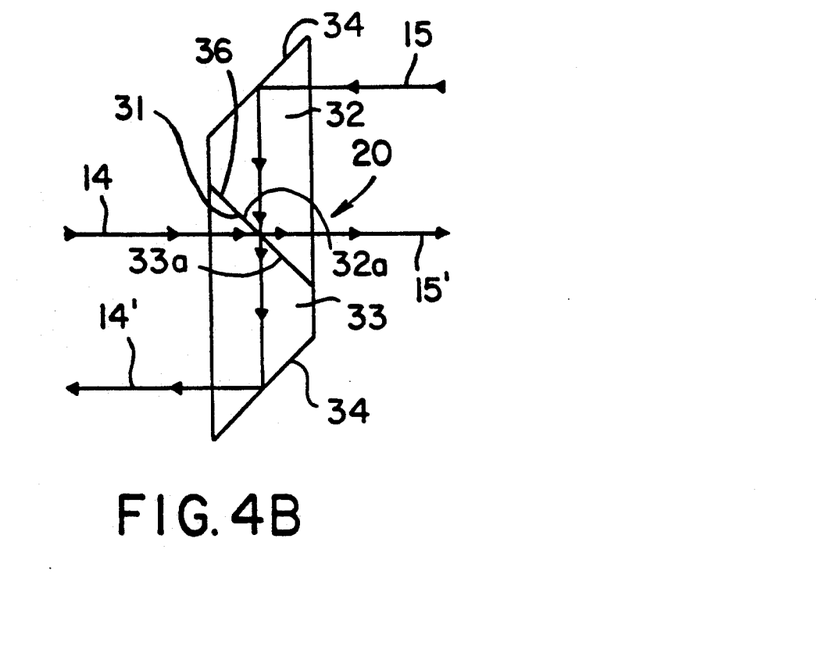

When switchable beamsplitter 20 is in the partial reflection, partial reflection mode, the prisms comprising the switchable beamsplitter are in very close proximity to each other (as shown by FIG. 4B) and are separated by a thin medium of low refractive index 36 which allows partial transmission of light beams 14, 15 across interface 31 and partial internal reflection within the prisms, known in the art as "frustrated total reflection". Beams 14, 15 are accordingly merged and split. This permits images from both light beams 14, 15 to be viewed in either eyepiece of the apparatus. When the dual images are brought into coincidence, calculation of parameters relating to the target objective may be effected, as will be more particularly described below.

Prisms comprising switchable beamsplitter 20 can be oriented relative to each other and moved between the two modes shown in FIGS. 4A and 4B by mechanical gearing (not illustrated) or other mans which allows one or both of the prisms to be slightly moved relative to the position of the other.

An example of one embodiment of a coincident ranging system which may be used to sense the target object angle of parallax follows: Once beams 14' and 15' exit the beamsplitter, they are reflected through a series of mirrors, prisms and/or lenses shown by 21a, 21b, 21c, 21d and 22a, 22b, 22c and 22d in FIG. 1 which depicts a representative or preferred arrangement. In FIG. 1, the depicted arrangement includes mirrors 21a, 22a while in FIG. 1A prisms 21b and 22b include pentaprism. Erecting lens 42, 42a may be used to invert the image into an upright image. Many variations or combinations of prisms or lenses could be employed to transmit beams 14 and 15 from the switchable beamsplitter 20 to eyepieces 23a, 23b, as will be understood by those persons skilled in the art.

Beams 14' and 15' will be perceived by an observer through eyepieces 23a, 23b as dual or split images of the target objective. The dual or split images are brought into coincidence by the observer through adjustment of coincidence sensor 25.

One embodiment of coincidence sensor means 25 comprises deviating element(s) such as 26a, 26b or 26c, coupled with electronic position sensor 30 which senses the position or relative displacement of the deviating element(s). When the deviating element(s) is displaced, it causes deviation of light beam 14, which has emanated from the target objective. Coincidence sensor means 25 serves as a means for sensing the separation of the dual or split images of the target object by by translating the relative physical displacement of the refracting element into an electrical signal, and relating this signal to a translation means 27 such as a microprocessor for processing.

In another embodiment of coincidence sensor means 25, two low power wedge type prisms 26a, 26b serve as deviating element and are aligned parallel with respect to each other and are capable of rotating counter-directionally as shown in FIG. 1. Deviating elements 26a, 26b are placed in front of one of the primary objective lenses such that light will enter deviating elements 26a and 26b before entering lens 16.

Figure 5:
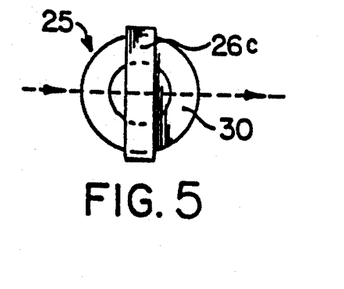
FIGS. 5 and 5A show a top perspective view of one embodiment of a coincidence sensor.
Figure 5A:
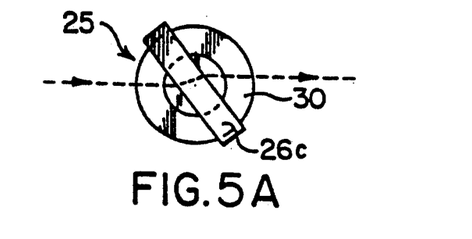
Figure 5B:
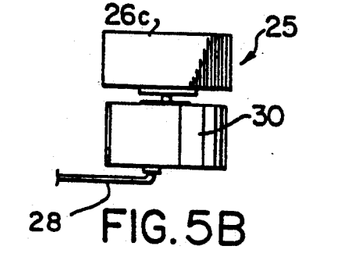
FIG. 5B shows a side view of one embodiment of coincidence sensor.

Another form of coincidence sensor means 25 as shown in FIGS. 5, 5A and 5B, may use a flat refractive glass plate 26c having parallel sides as the deviating element. Other means for effecting deviation of light beams are known by those skilled in the art may also be used as deviating element and are within the scope of this invention.

Deviating element (such as 26a, 26b, or 26c) is coupled to electronic position sensor 30, which is a position verification device which can measure or indicate rotary or linear motion, and may be an analog component such as a variable resistor or variable capacitance component such as a potentiometer or variable capacitor or a digital component such as a digital optical encoder or other. Analog signals may be converted to digital signals before processing by translation means 27 such as a microprocessor. Displacement of deviating element(s) (such as 26a, 26b or 26c) is effected by the observer using mechanical adjustment means 29. Incoming beam 14 is deviating to align with incoming beam 15 such that the dual images of the target objective form coincident images as observed through the eyepiece 23a, 23b of the apparatus. When the deviating element(s) is displaced, the light beam 14 is deviated, the extent of such refraction being proportional to the degree of rotation or relative displacement of the deviating element, as shown by the dotted outline of deviating element 26c in FIG. 1A, and by FIGS. 5 and 5A.

The amount of displacement of the deviating element (s) is inversely proportional to the remoteness of the target object whose image is formed by light beams. When the dual images of the target object, as seen through the eyepieces of the apparatus, are brought into coincidence, the amount of displacement to which deviating element(s) has been subjected is measured by sensor 30 which converts this data into an electrical signal which is relayed to translation means 27 by lead 28.

In one of the invention, improved focusing means are provided to aid the user in aligning dual images of the objective into coincidence. The spectrum of the light beams entering the beamsplitter are divided at the interface of the switchable beamsplitter 20, to form two distinctly different color images at the eyepiece to assist the user in precisely aligning the images into coincidence. This is achieved by coating one or both faces of the interfacing beamsplitter components with a optical coating 3. This coating is designed in such a way that at select angles of incidence, light transmitted through the optical coating 3 will be a distinctly different color from light which is reflected. In the case of the optical switchable beamsplitter, optical coating 3 may be applied before or after the application of the transparent electrode coatings 8, 9 to one or both faces of the interfacing beamsplitter components 32, 33. With the optical coating 3 in place, when the switchable beamsplitter 20 is in the total internal reflection mode light transmitted through the optical coating 3 will be totally reflected at the interface 31 and will form substantially naturally colored images.

When the switchable beamsplitter 20 is in the partial transmission, partial reflection mode for rangefinding, one component of the light will be divided into two distinctly different color groups, transmitting one color group (e and f in FIG. 3) across the interface 31 of the two beamsplitter prisms 32, 3 and reflecting a second color group (b and c in FIG. 3) at the interface of the two beamsplitter prisms.

Effectively, this division of a portion of the naturally reflected light into two distinctly different color groups will assist the user in precisely aligning dual images into a single coincident image for the purpose of ranging a target. When the dual images are out of coincidence, the images will each comprise a different portion of the full natural spectrum of light reflected by the target, and will therefore appear to be differently colored. If the dual images are not precisely in coincidence, different colored fringes will appear on the periphery of the images. When the dual images are aligned in perfect coincidence, the single target image formed will contain nearly the full spectrum of light reflected by the target itself and will therefore appear naturally colored.

If the device according to the present invention is intended for use in calculating dimensions or parameters in addition to range, the device may be equipped with one or more additional sensors 39, 40, 41 and/or a timing device or chronometer 55.

Horizontal sensor 39 electronically senses the angular displacement of the instrument on a horizontal or azimuth plane with reference to a fixed point, e.g. a ground reference, magnetic pole, or astronomical reference point, while the apparatus is held or fixed, e.g. mounted on a tripod. Displacement of the instrument as measured by the horizontal sensor 39 is translated to an electronic signal which is related to translation means 27.

The apparatus may also be equipped with a compass sensor 41, which may be a type of horizontal sensor. A compass sensor consists of an electronic magnetic direction finding component, one type of which is referred to as a Flux Gate Sensor, and sold by KVH Industries of Rhode Island, U.S.A.

Equipped with such a compass sensor 41, the apparatus can also be used to calculate the magnetic bearing of the target objective.

Vertical sensor 40 is a vertical displacement sensor which electronically senses the angular displacement of the instrument on a vertical plane with reference to the natural gravitational lines of the earth. Vertical sensor 40 can take numerous forms. Vertical sensor 40 could be an electrolytic level sensor such as those manufactured and sold by The Fredericks Company of Pennsylvania, U.S.A.

An apparatus featuring a horizontal sensor 39 and vertical sensor 40 can be used to calculate height, as well as horizontal or vertical distances or angles between two remote points.

The number and type of dimensions or parameters which can be calculated by the apparatus will depend upon the number and type of sensors with which it is equipped. Several different combinations or permutations of sensors are therefore possible and accordingly a number of different instruments having varying capabilities can be constructed and all are within the scope of this invention.

The following Table shows several different combinations of features with which the invention can be equipped and the corresponding parameters of the target objective which can be determined by an apparatus so equipped.

| | Apparatus Equipped with: | Parameters of Target Objective |
|---|---|---|
| 1 | Coincidence sensor | Range |
| 2 | Coincidence sensor and horizontal sensor | Range; distance and/or angle between two points in a horizontal plane |
| 3 | Coincidence sensor and compass sensor | Range; distance and/or angle between two points in a horizontal plane; magnetic bearing |
| 4 | Coincidence sensor and vertical sensor | Range: distance and/or angle between two points in a vertical plane |
| 5 | Coincidence sensor and vertical sensor and horizontal sensor | Range; distance and/or angle between two points in a vertical and/or horizontal plane; surface area |
| 6 | Coincidence sensor and vertical sensor and compass sensor | Range; distance and/or angle between two points in a horizontal and/or vertical plane; magnetic bearing; surface area |
| 7 | Coincidence sensor and horizontal sensor and chronometer | Range; distance and/or angle between two points in a horizontal plane; speed (in horizontal plane) |
| 8 | Coincidence sensor and compass sensor and chronometer | Range; distance and/or angle between two points in a horizontal plane; magnetic bearing; speed (in a horizontal plane) |
| 9 | Coincidence sensor and vertical sensor and horizontal sensor and chronometer | Range; distance and/or angle and/or angle between two points in a horizontal and/or vertical plane; speed (in a horizontal and/or vertical plane) |
| 10 | Coincidence sensor and vertical sensor and compass sensor and chronometer | Range; distance and/or angle between two points in a horizontal and/or vertical plane; surface area; speed (in a horizontal and/or vertical plane) |

Once beams 14', 15' exit from the beamsplitter these are reflected to the eyepieces 23a, 23b, where the images may be viewed by the observer. Information from the sensor(s) and chronometer (where present) are fed to translation means 27 which uses such information to enable it to calculate dimensions or parameters of the target objective, such as range, height, magnetic bearing or relative speed, as selected by the operator. Data from translation means 27 may be relayed to digital display 43 which may be a clear LCD display placed within an image plane so that he parameter as calculated by translation means 27 is displayed within the observer's field of view. If memory storage capacity additional to that of the microprocessor is desired, the apparatus may optionally contain a memory storage module.

Although the scope of the invention also includes a monocular device of the same basic construction, the preferred embodiment of the invention features dual eyepieces, since binocular viewing produces less eye strain than monocular viewing. Most binoculars or field glasses are designed such that there is a hinge which joins each of the two telescopes which form the binocular. This hinge allows the distance between the eyepieces to be adjusted to accommodate the interpupillary distance of various users. Because it is convenient to embody this invention in a single housing, other means of adjusting correct interpupillary alignment must be provided. One means for accomplishing this entails one eyepiece being moved laterally with respect to the other. In doing so however, it becomes necessary to maintain a constant length of the light path to the eyepiece which is moved to prevent image defocusing. One way to achieve this entails moving eyepiece 23b and eyepiece mirror 22a to increase or decrease the distance between the eyepieces while moving erecting prism 42a a distance equal to half the movement of eyepiece 23b and eyepiece mirror 22a as shown in dotted outline in FIG. 1. This will ensure that the length of the optical path remains constant.

Figure 6:
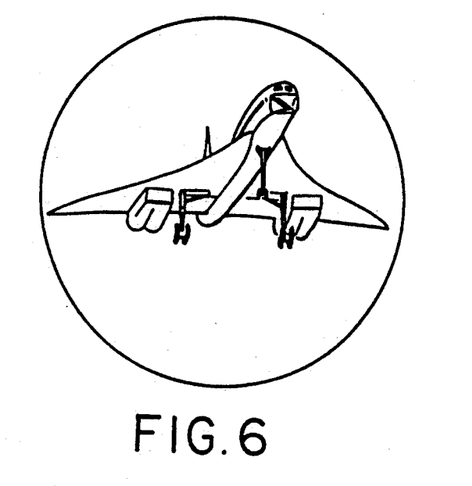
FIGS. 6, 7, 8A, 8B, 9A, 9B, 10A and 10B each illustrate representative applications of embodiments of the invention, being depictions of representative target objects as viewed by the observer through the eyepieces of the instrument.

Representative fields of view of the apparatus as shown by eyepieces 23a, 23b is depicted in FIGS. 6, 7, 8A, 8B, 9A, 9B, 10A and 10B. In FIG. 6 the apparatus is functioning as a conventional binocular. In FIGS. 7, 8A, 8B, 9A, 9B, 10A and 10B, the apparatus is functioning as a measurement device and observer sees the target objective, together with data displayed digitally.

When operating the apparatus subject of the present example of the invention when ranging, or using the apparatus to measure other parameters the observer looks through the eyepieces, sees dual or split images of the target objective, and brings these into coincidence by manipulating coincidence sensor means 25.

Figure 8A:
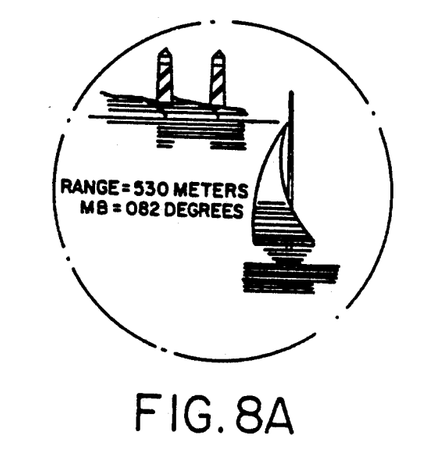
Figure 8B:
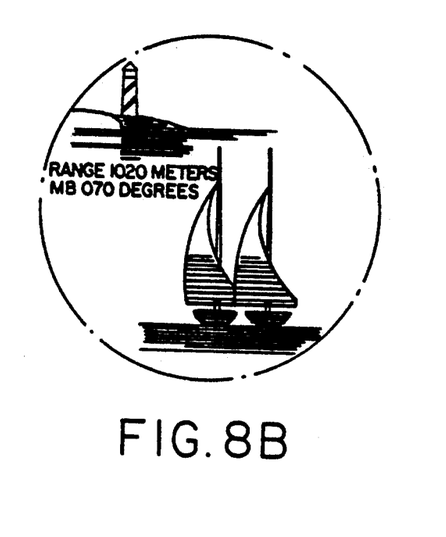

FIG. 8A illustrates what the observer sees where the target object is the sailboat. The dual images of the sailboat have been brought into coincidence, but dual images of the background lighthouse remain. If it is desired to range the lighthouse, the dual images are brought into coincidence, which means that there are dual images of the sailboat in the foreground, as shown by FIG. 8B. In each case, the calculated parameters are displayed.

The observer then selects the function or parameter which is desired to be calculated by means of making appropriate selections or entries on control pads or switches on instrument panel 53. Instrument panel 53 includes a button or pad enabling the operator to select a desired function or parameter to be calculated (SELECT switch 45); a button or pad enabling the operator to select whether reading of the selected parameter are to be calculated in metric or English system or other systems of measurement (METRIC/ENGLISH switch 46); a button or pad which when pushed, causes data from the sensors to be entered/relayed to microprocessor (ENTER switch 47); and a button or pad which fixes the digital display of parameters, to enable the data to be recorded if desired (FREEZE/UNFREEZE switch 48); and an on/off switch 49, and a calibration switch.

The functions or parameters selected by the observer are calculated by translation means 27 such as a microprocessor using data received from sensors 25, 39, 40, 41, and chronometer 55. The parameters calculated by translation means 27 are then relayed to digital display 43 and the information appears in the observer's field of view within eyepiece 23. Optionally, the invention may also include an exterior digital display panel 52 upon which the information may also be displayed.

In order to ensure that the optical systems of the instrument have uniform properties of expansion and contraction when subjected to differences in temperature, and to increase shock absorbance and resistance of the instrument to temperature fluctuations, thereby reducing the need for frequent recalibration of the instrument, prisms and switchable beamsplitter 20 may be secured to a mounting plate 50 which is secured to housing 11.

Unlike infrared or laser rangefinders, the device of the present invention does not require a large power source, but can be powered by power supply means 57 which can be batteries.

Optionally, the invention can be mounted on a tripod (not shown) by means of tripod mount secured to the housing of the instrument.

Examples of possible applications of possible embodiments of the instrument subject of this invention are illustrated by means of the following examples:

Example 1

In one embodiment of the invention when the on/off switch of the instrument is in the "off" position, no digital display will appear in the eyepieces and the apparatus can be used as conventional binoculars, as shown by FIG. 6, which shows an airplane as the target objective.

Example 2 - RANGE, HEIGHT, AND MAGNETIC BEARING FUNCTION

Alternatively, the instrument can also be used as a binocular coincidence type optical rangefinder, when the instrument is turned on and the coincidence sensor used to bring dual or split images of the target objective into coincidence.

Figures 7, 9A, 9B, 10A, 10B:
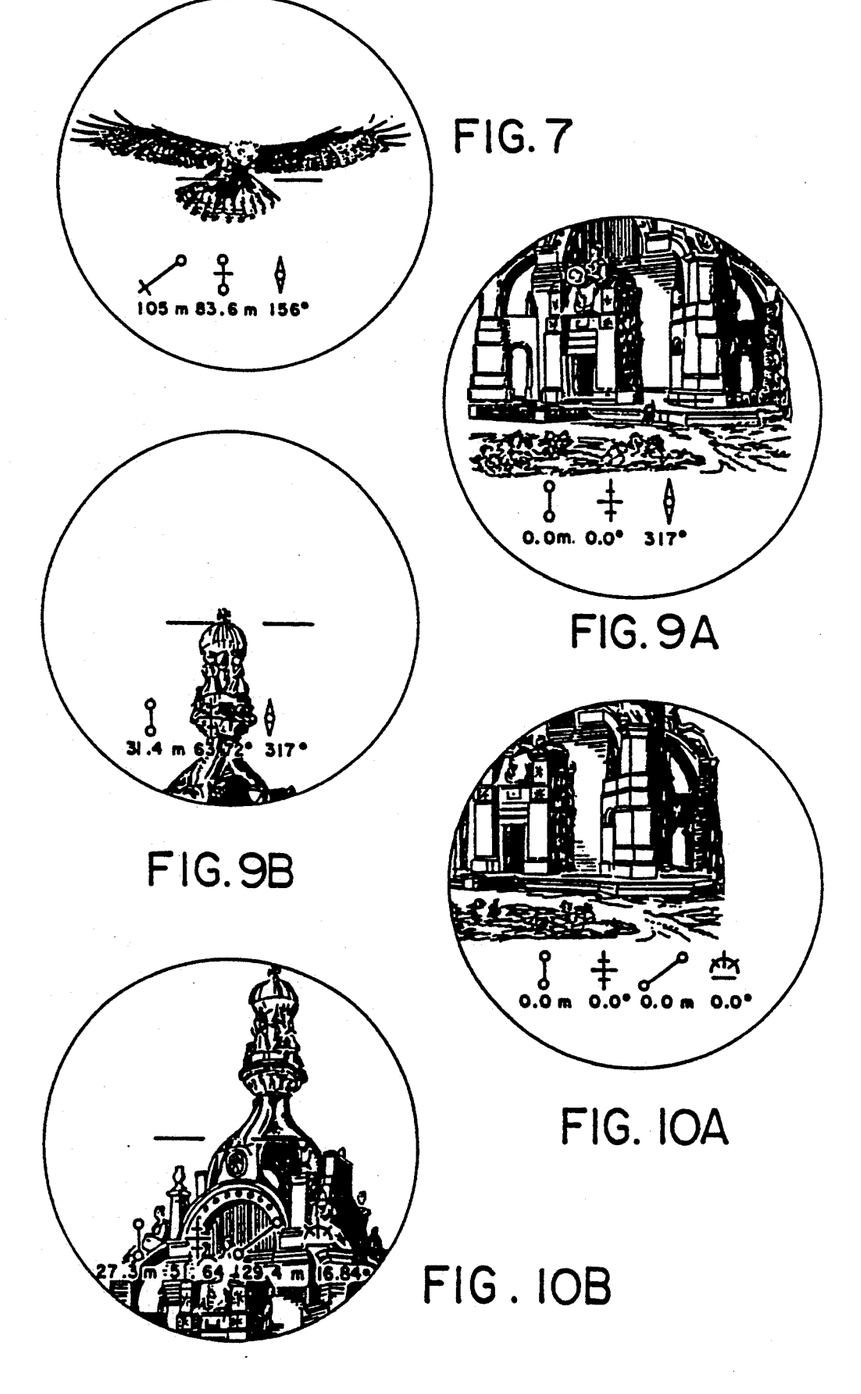

In pushing the SELECT switch, the operator can select one or more functions which will calculate various parameters, or switch switchable beamsplitter 20 between modes. FIG. 7 shows a bird as the target objective.

In this example, when the instrument is turned on, one function selected will display the symbols for range, height, and magnetic bearing.

To read a single object, such as the bird in this example, the operator adjusts the coincidence sensor until a single, coincident clear image appears, then reads the calculated data from the eyepiece display:

| | |
|---|---|
| 105 m | range of bird from operator |
| 83.6 m | height of bird above operator's eyes. |
| 156° | magnetic bearing |

If desired the readings can be held within the eyepiece display and to do so the operator pushes the FREEZE/UNFREEZE switch. The readings may then be recorded if desired.

The operator may then push the SELECT switch to choose another function.

Example 3 - VERTICAL OUTPOINTS FUNCTION

This function relates points with vertical separation and may be used to determine vertical distance and angle between points. The function may be used when the apparatus is hand held or mounted on a tripod.

To select this function, the operator pushes the SELECT switch, and reads the symbols. To read the vertical distance of the pinnacle of the temple shown in FIGS. 9A and 9B above its base, in this example the operator sights the base, adjusts the coincidence sensor and pushes the ENTER switch. He then sights the top of the pinnacle, and resets the coincidence sensor.

The readings are displayed within the eyepiece:

| | |
|---|---|
| 31.4 m | vertical distance between base and pinnacle. |
| 63.72° | vertical angle between base and pinnacle. |

| | |
|---|---|
| 317° | magnetic bearing. |

These readings can be held within the field of display by psuhing the FREEZE/UNFREEZE switch. The readings may then be recorded if desired.

Either push ENTER witch, may be pushed to restart this function, or the SELECT switch for a different function.

Example 3 - HORIZONTAL OUTPOINTS FUNCTION

This function may be used to determine horizontal plane relations between two points. This is a handheld or tripod mount function of the apparatus which relates points with both vertical and horizontal separation. This function may be used to determine vertical distance and angle between points, and horizontal or slant distance and angle between points.

To select this function, the operator will push the SELECT switch, and read the symbols for horizontal outpoints. To read the vertical and horizontal relations between the base of the right buttress, to the top of the arch of the temple shown in FIGS. 10A and 10B, in this example, the operator sights the base of the buttress, adjusts the coincidence sensor and pushes the ENTER switch. The top of the arch is then sighted and the coincidence sensor is again adjusted.

The readings are displayed within the eyepiece display:

| | |
|---|---|
| 27.3 m | vertical distance between base and arch. |
| 51.64° | vertical angle between base and arch. |
| 29.4 m | slant distance between base and arch. |
| 16.84° | horizontal angle between base and arch. |

These readings can be held within the eyepiece display by pushing the FREEZE/UNFREEZE switch. The readings may then be recorded if desired.

Either the ENTER switch may be pushed to restart this function, or the SELECT switch to choose a different function.

The preceding examples illustrates a sample of the many number of routines which may be created to measure one or more parameters, by using data gathered by sensors or combinations of sensors which are capable of sensing range, vertical displacement, horizontal displacement, compass bearing, or time, and are not to be read as limiting the scope of the invention.

I claim:

1. An optical apparatus switchable between the functions of an observation binocular wherein simple target object images are formed from each of two eyepieces, and the functions of a coincidence type optical rangefinder wherein dual said target object images are formed within the field of view of at least one of said two eyepieces, comprising:

(a) a pair of spaced entrance windows to receive electromagnetic radiation from said target object; (b) a pair of eyepieces;

(c) a switchable beamsplitter, switchable between said functions of an observation binocular and said functions of a coincidence type optical rangefinder, comprising a pair of prisms, each having at least one total internal reflection face wherein these said total internal reflection faces form an interface and are substantially plane parallel with respect to each other;

(d) means, for causing said switchable beamsplitter to be switchable, between the said functions of an observation binocular, wherein the said interface comprises a medium of refractive index sufficient to effect total internal reflection of said electromagnetic radiation incident upon said interface, and between the said functions of a coincidence type optical rangefinder wherein said interface comprises a medium of refractive index sufficient to effect partial reflection, and partial transmission of said electromagnetic radiation incident upon said interface;

(e) a first series of reflectors or lenses which direct said electromagnetic radiation from said windows to said switchable beamsplitter;

(f) coincidence sensor means, for sensing the angle of parallax formed by the said target object and the said pair of spaced entrance windows;

(g) a second series of reflectors or lenses for directing said electromagnetic radiation from said switchable beamsplitter to said eyepieces;

(h) translation means, for transforming information from said coincidence sensor means into parameters relating to the position, dimension, or orientation of said target object relative to said apparatus; and (i) display means for displaying said parameters.

2. An optical apparatus as claimed in claim 1 wherein said means for causing the said switchable beamsplitter to be switchable comprises: moving at least one of said prisms from a first position wherein said medium of refractive index is of sufficient thickness to effect total internal reflection, to a second closer position wherein said medium of refractive index is of sufficient thickness to effect frustrated total internal reflection.

3. An optical apparatus as claimed in claim 1 wherein said means for causing said switchable beamsplitter to be switchable comprises:

(a) a layer of liquid crystal material filling said interface between said total internal reflection faces of said pair of prisms, whereby, in a first total internal reflection mode, said electromagnetic radiation incident upon said layer of liquid crystal material will be totally internally reflected, and in a second partial reflection, partial transmission mode, an electromagnetic field is applied across said liquid crystal material whereby the refractive index of said liquid crystal material is altered such that said electromagnetic radiation incident upon said liquid crystal is divided into two polarization components, one of said polarization components being totally, or nearly totally reflected, and the other of said polarization components being totally, or nearly totally transmitted;

(b) power supply means for energizing and introducing said electromagnetic field across said layer of liquid crystal material; and (c) control means, for switching said electromagnetic field to effect a said first total internal reflection mode, and to effect a said second partial reflection, partial transmission mode.

4. An optical apparatus as claimed in claim 3 wherein said pair of prism each of which has at least one total internal reflection face, each said prism additionally comprises a second internal reflection face oriented to said at least one total internal reflection face at substantially 90 degrees, whereby said electromagnetic radiation entering said prism will be reflected substantially 180 degrees within said prism.

5. An optical apparatus as claimed in claim 1 wherein at least one of said total internal reflection faces additionally comprises an optical coating, such that when used in the said functions of an observation binocular, said electromagnetic radiation incident upon said medium of refractive index will totally internally reflected, and form substantially naturally colored images, and when used in the functions of a coincidence type optical rangefinder, said electromagnetic radiation incident upon said optical coating will be divided into two different wavelength groups of the electromagnetic spectrum, one said group being reflected, and the other said group being transmitted through said medium of refractive index.

* * * * *